United States Patent
Bostick et al.

(10) Patent No.: US 10,338,407 B2
(45) Date of Patent: Jul. 2, 2019

(54) DYNAMIC CONTEXTUAL VIDEO CAPTURE

(71) Applicant: International Business Machines Corporation, Armonk, NY (US)

(72) Inventors: James E. Bostick, Cedar Park, TX (US); John M. Ganci, Jr., Cary, NC (US); Martin G. Keen, Cary, NC (US); Brian M. O'Connell, Cary, NC (US)

(73) Assignee: International Business Machines Corporation, Armonk, NY (US)

( * ) Notice: Subject to any disclaimer, the term of this patent is extended or adjusted under 35 U.S.C. 154(b) by 25 days.

(21) Appl. No.: 15/632,835

(22) Filed: Jun. 26, 2017

(65) Prior Publication Data

US 2018/0373058 A1     Dec. 27, 2018

(51) Int. Cl.
| | |
|---|---|
| *G03B 17/48* | (2006.01) |
| *G02C 7/04* | (2006.01) |
| *H04N 5/225* | (2006.01) |

(52) U.S. Cl.
CPC .............. *G02C 7/04* (2013.01); *G03B 17/48* (2013.01); *H04N 5/2251* (2013.01); *H04N 5/2257* (2013.01)

(58) Field of Classification Search
CPC ...... G02C 7/04; G03B 17/048; H04N 5/2251; H04N 5/2257
USPC ................. 351/159.01–159.03, 159.39, 178; 386/224, 228; 706/16, 21; 348/115, 348/E13.036, E13.041, E13.048–E13.052
See application file for complete search history.

(56) References Cited

U.S. PATENT DOCUMENTS

| | | | |
|---|---|---|---|
| 8,582,832 B2 | 11/2013 | Angell et al. | |
| 2009/0132583 A1* | 5/2009 | Carter | G06F 17/30038 |
| 2014/0098226 A1 | 4/2014 | Pletcher et al. | |
| 2015/0128162 A1* | 5/2015 | Ionescu | G06Q 30/00 |
| | | | 725/14 |
| 2015/0237389 A1* | 8/2015 | Grouf | H04N 21/26283 |
| | | | 725/49 |
| 2015/0318020 A1 | 11/2015 | Pribula | |
| 2016/0091737 A1 | 3/2016 | Kim et al. | |

(Continued)

OTHER PUBLICATIONS

Elgan, Mike, "Why a smart contact lens is the ultimate wearable", Computerworld | May 9, 2016 3:00 AM PT, copyright © 2017 IDG Communications, Inc., 6 pages, <http://www.computerworld.com/article/3066870/wearables/why-a-smart-contact-lens-is-the-ultimate-wearable.html>.

(Continued)

*Primary Examiner* — Stephone B Allen
*Assistant Examiner* — Travis S Fissel
(74) *Attorney, Agent, or Firm* — Brian M. Restauro; Christopher M. Pignato (57) ABSTRACT

Embodiments of the present invention provide a method, computer program product and system for dynamic video capture through a contact lens based on dynamic contextual identification. Initially, a set of identifying information and a video stream from a contact lens is received. A determination is made as to whether to capture the video stream, based on the received information. The determining to capture the video stream is based on, at least one of, the user interest level exceeding a threshold and detecting a contextual identifier within the received the video stream from a contact lens. Responsive to determining to capture the video stream, the video stream is classified into a category and saving based on the classification category of the video stream.

17 Claims, 4 Drawing Sheets

(56) References Cited

U.S. PATENT DOCUMENTS

| | | |
|---|---|---|
| 2016/0097940 A1 | 4/2016 | Sako et al. |
| 2016/0299354 A1* | 10/2016 | Shtukater |
| 2016/0299357 A1* | 10/2016 | Hayashi ................ G02C 7/101 |
| 2017/0085951 A1* | 3/2017 | Singh ............... H04N 21/42201 |
| 2017/0097520 A1 | 4/2017 | Lee |
| 2017/0208027 A1 | 7/2017 | Goldstein |
| 2017/0215011 A1 | 7/2017 | Goldstein |

OTHER PUBLICATIONS

Fong, Joss, "The Meaning of Pupil Dilation", The Scientist, Dec. 6, 2012, 5 pages, <http://www.the-scientist.com/?articles.view/articleNo/33563/title/The-Meaning-of-Pupil-Dilation/>.

Bostick et al., "Dynamic Contextual Video Capture", U.S. Appl. No. 15/839,892, filed Dec. 13, 2017, 34 pages.

Appendix P—List of IBM Patents or Patent Applications Treated as Related, Filed herewith, 2 Pages.

\* cited by examiner

DYNAMIC CONTEXTUAL VIDEO CAPTURE

BACKGROUND

The present invention relates generally to the field of video recording of a target from the perspective of a user, and more particularly to learning when to commence and end recording based on various scenarios and/or conditions.

In recent years, an increasing number of individuals wear prescription contact lenses in order to correct visual defects thereby improving ones vision. Generally, contact lenses are worn to correct vision and/or for cosmetic reasons, (i.e., alter the appearance of one's eye).

Advances in technology are leading towards the miniaturization of commonly used devices. Computing devices, for instance, have benefited from recent advancements in microprocessor design, providing increasingly complex computations while decreasing the size of respective components of the device. For example, the hardware needed for video recording can me miniaturized and associated with a variety of devices such as a camera on a mobile/smart phone, a camera on a smart watch, etc.

SUMMARY

Another embodiment of the present invention provides a computer program product for dynamic contextual video capture through a contact According to an aspect of the present invention, there is a method that performs the following operations (not necessarily in the following order): receiving, by one or more processors, a set of identifying information and a video stream from a contact lens; determining, by one or more processors, whether to capture the video stream, wherein determining to capture the video stream is based on, at least one of, the user interest level exceeding a threshold and detecting a contextual identifier within the received the video stream from a contact lens; classifying, by one or more processor, the video stream into a category, and responsive to determining to capture the video stream, saving, by one or more processors, the video stream based on the classification category of the video stream.

Another embodiment of the present invention provides a computer program product for dynamic contextual video capture through a contact lens, based on the method described above.

Another embodiment of the present invention provides a computer system for dynamic contextual video capture through a contact lens, based on the method described above.

DETAILED DESCRIPTION

Electronic devices have become an essential part of daily life. Advances in electronic technology allow for devices to communicate and exchange data. Many devices have 'smartness' features enabling such devices and systems to be programmed to operate and communicate electronically over the internet. Additionally, a 'smartness' feature associated with many devices and systems provides for systems to run independent of direct human control and/or human supervision through either artificial intelligence and/or machine learning.

Embodiments of the present invention combine miniaturization of commonly used devices with a contact lens which can learn when to record what the wearer of the contact lens sees. Specifically, embodiments of the present invention provide solutions for self-learning lenses that can determine appropriate instances to record.

Embodiments of the present invention improve determinations made to automatically start and stop recording. Specifically, embodiments of the present invention provide solutions for determining when to and when not to record subject matter utilizing a contact lens with a built in camera and sensors. This smart contact lens enables the user to discretely wear a recording device and upload recorded information as needed to one or more locations. More specifically, embodiments of the present invention reveal situations defined and/or learned where a user does not want to video record and/or have the ability to classify a video recording as restricted, public and/or private in a repository along with an ability to share the recording on social media.

Embodiments of the present invention recognize the need for more effective determination of when to automatically commence recording images, and when to stop recording images. For example, typically, a recording device has a manual setting and relies on the user to select when to start and stop recording a subject matter and/or event. In some instances, the user of the recording device may have the capability to save the captured event privately or make the captured event publicly through some form of social media sharing service. Embodiments of the present invention provide solutions for automatically commencing recording of a subject matter and/or event, identifying contextual information of the recorded subject matter, and save the recorded subject matter based on the identified contextual information using one or more computer processors of a contact lens. Specifically, embodiments of the present invention classify the content of the image and determines whether to record based on defined and learned contextual identifiers in detected in the image. A contextual identifier represents an identifiable a person, place, item, object, activity and the like, through cognitive analytical systems. A contextual identifier can be predefined or machine learning. Further, a contextual identifier may be identified through facial recognition, and object recognition, various sensors to identify a specific activity (e.g., biking, running, dancing, etc.), location determination systems (e.g., GPS) and the like. Further, embodiments of the present invention classify situations that video recording should be restricted based on defined and learned contextual identifiers. Further, embodiments of the present invention can, based on the situation and contextual identifiers may determine where and how to save a recorded video. For example, embodiments of the present invention may determine to save the video on the cloud, on a personal server, on a personal computing device, on a personal smart phone, etc. In another example, embodiments of the present invention may determine how to save the video such that the video may be classified as restricted, private and/or personal, dependent on the situation and contextual identifiers.

Figure 1:
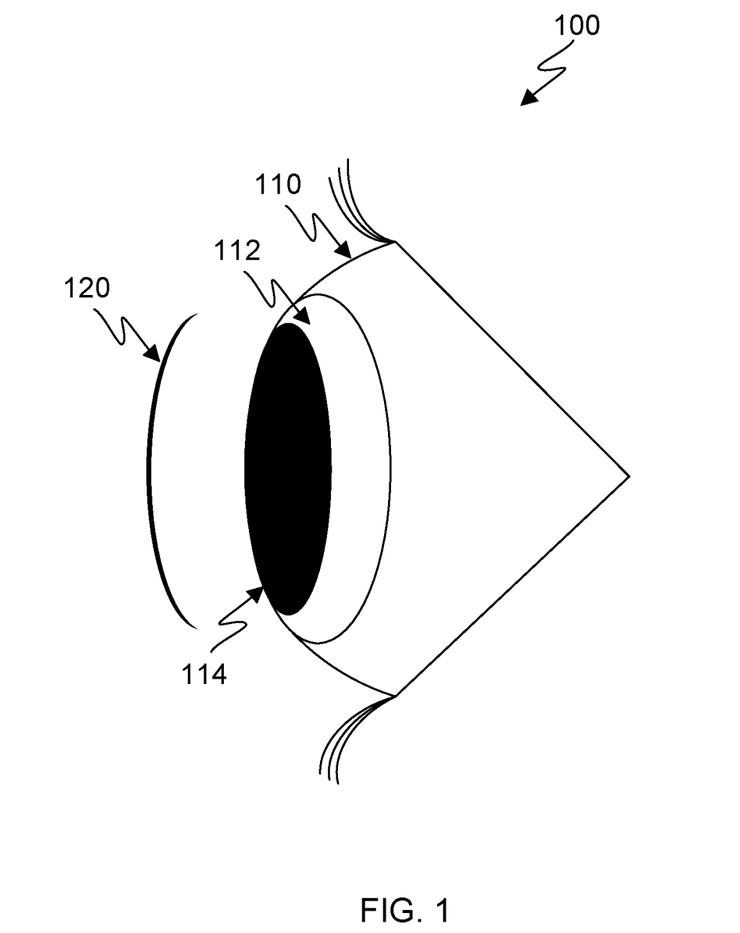
FIG. 1 is a functional block diagram of a human eye, in accordance with an embodiment of the present invention.

The present invention will now be described in detail with reference to the Figures. FIG. 1 portrays environment 100, depicting a user's eye represented as eye 110 and smart contact lens 120. Elements of eye 110 include, but is not limited to iris 112, pupil 114 as well as other elements not depicted in FIG. 1 (e.g., the cornea, lens, aqueous and vitreous humor). Generally, an eye operates by focusing light from the environment onto the retina of the eye, such that images of the environment are presented in-focus on the retina. The natural lens of the eye can be controlled (e.g., by ciliary muscles of the eye) to allow objects at different distances to be in focus at different points in time.

Iris 112 is the heavily pigmented portion of a human eye. Generally, iris 112 may be brown, green, or blue depending on the amount and distribution of pigment. Pupil 114 is a hole within eye 110 in which light passes through. Iris 112 and pupil 114 may inversely change size to allow for different levels of light to enter eye 110. Specifically, pupil 114 is an opening within iris 112. One or more muscles (e.g., the sphincter muscle, not shown) controls the diameter of pupil 114. For example, by relaxing (dilating and enlarging) pupil 114, a greater amount of light can enter eye 110. Alternatively, by constricting (reducing) pupil 114, less light may enter eye 110. Typically, pupil 114 diameter changes between 3-7 mm. As pupil 114 diameter changes (i.e., larger or smaller), so too does iris 112 diameter change in an inverse proportion.

Pupil 114 may constrict or dilate for numerous reasons. For example, when ambient light levels increase, pupil 114 constricts so that less light will enter eye 110. Pupil 114 may dilate when ambient light levels are low, thereby allowing a greater amount of light to enter eye 110. In addition to pupil 114 changing its size based on ambient light, pupil 114 may constrict or dilate based on the person's emotions and/or feelings towards the subject the person is looking at. For example, if the user is experiencing pain, experiencing one or more intense emotions (e.g., happiness, sadness, anger, surprised, fear, stress, etc.), etc, pupil 114 may constrict or dilate. Similarly, mental activity level may affect pupil dilation. For example, level of attention, level of interest, cognitive load, etc. may affect pupil dilation. In another example, pupil size may change based on a specific activity, such as lying. Further, pupil 114 may constrict or dilate based on other influences such as medication, alcohol, and certain drugs. Additionally, pupil 114 may constrict or dilate based on medical issues such as neurological disorders and concussions.

Therefore, embodiments of the present invention recognize that pupil size may be an indicator of a person's interest in a particular subject and/or state of mind.

Smart contact lens 120 may be worn on one or both eyes of a user. As depicted in an exploded view in FIG. 1, smart contact lens is separated from eye 110, for illustration purposes only. However when worn by user, smart contact lens 120 is worn directly over eye 110, similarly to a traditional contact lens used to correct vision. FIG. 1 depicts only a single smart contact lens 120 and single eye 110, however, it should be understood that a smart contact lens 120 may be worn on each eye 110 of a user.

Generally, smart contact lens 120 is exposed both to air and a body's internal chemistry. In this embodiment, smart contact lens 120 is made to an optimal specification where smart contact lens is strong enough to withstand the mechanical movement of blinking, an impact by a human touch, being in contact with a foreign object (e.g., dust, hair, and other unknown particulates), yet comfortable enough to be worn adjacent human eye 110. A traditional contact lens sits on directly over eye 110 to enhance vision. Smart contact lens 120 may also possess vision improvement characteristics.

Figure 2:
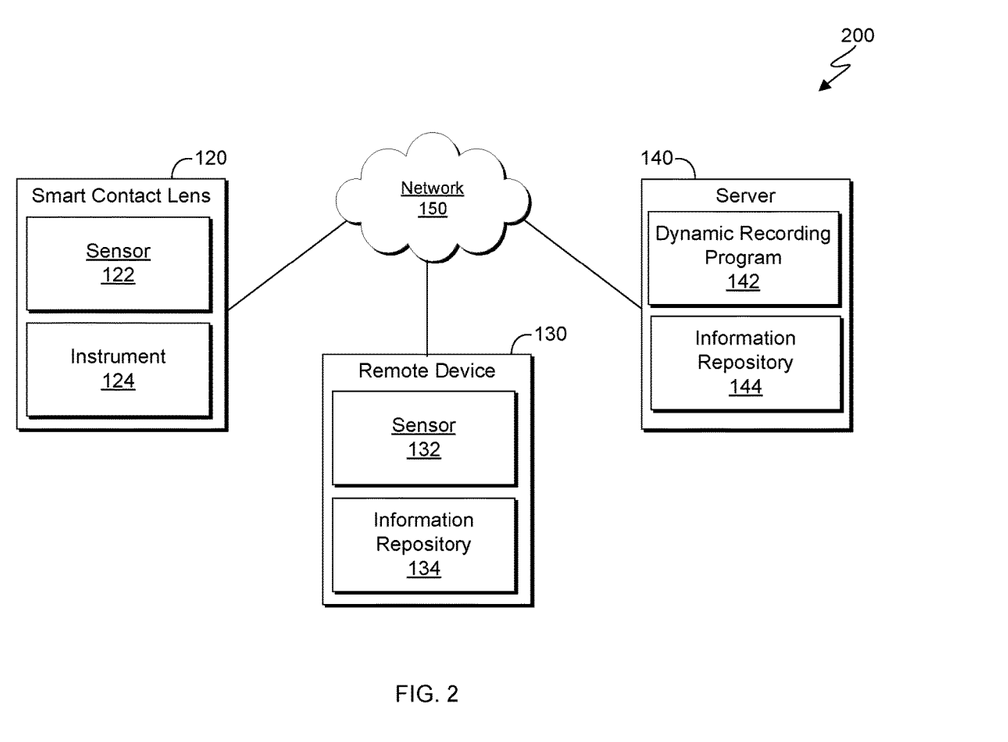
FIG. 2 is a functional block diagram illustrating a data processing environment, in accordance with an embodiment of the present invention.
Figure 3:
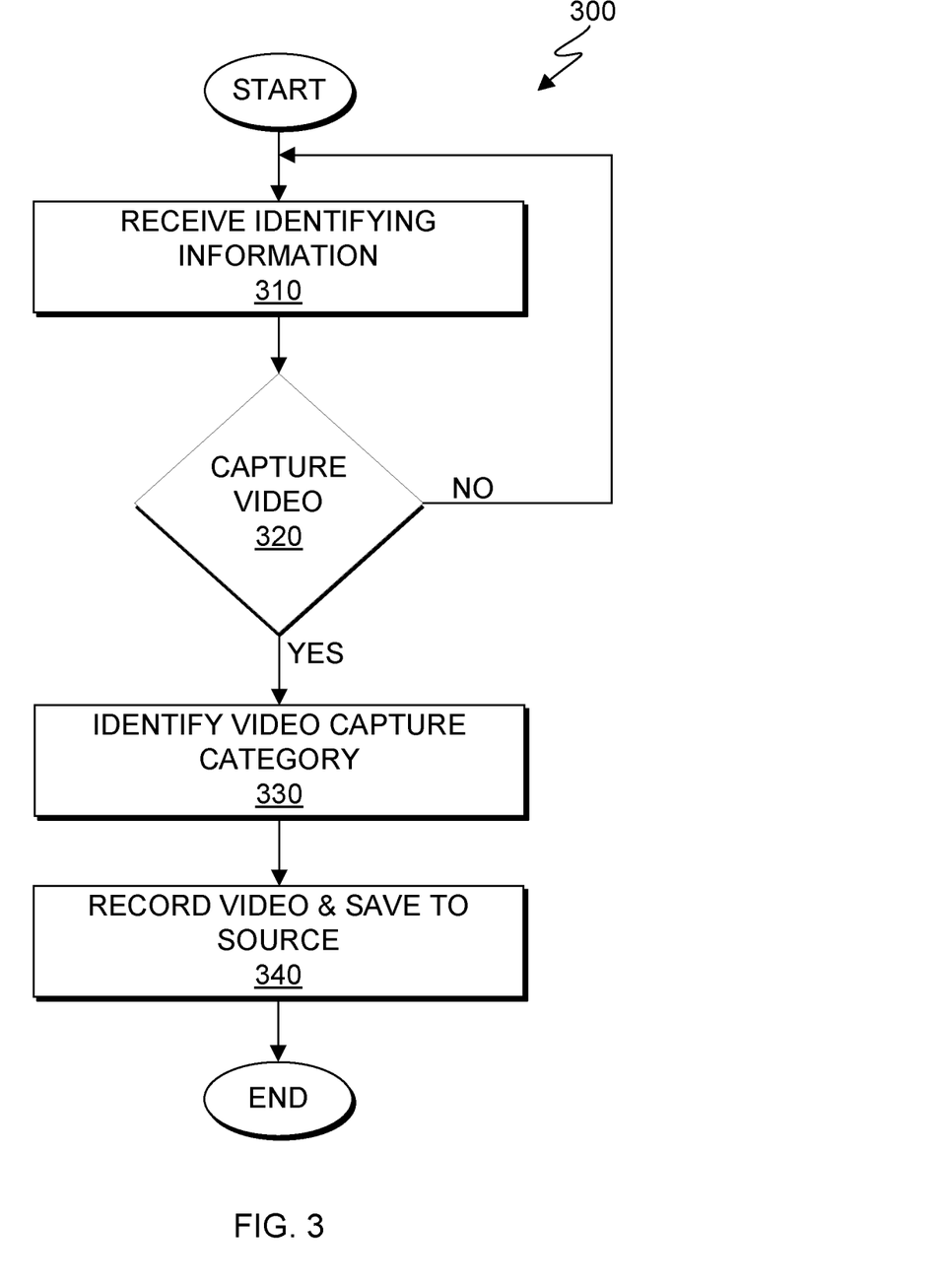
FIG. 3 is a flow chart illustrating operational steps for contextual video capture in accordance with an embodiment of the present invention.

Smart contact lens 120 automatically commences recording of a subject matter and/or event, identifies contextual information of the recorded subject matter, and saves the recorded subject matter based on the identified contextual information using one or more computer processors of a smart contact lens 120 (not shown in FIG. 1), as described in greater detail with regard to FIGS. 2 and 3. In this embodiment, smart contact lens 120 may capture biometric information related to the user. Smart contact lens 120 can communicate both the captured image information and biometric information to a computing device (not shown in FIG. 1). Smart contact lens 120 can receive input from a computing device (not shown in FIG. 1), a user, or dynamic recording program (not shown in FIG. 1), among others. Smart contact lens 120 may communicate via a wireless network to additional devices (not shown in FIG. 1).

Reference is now made to FIG. 2. FIG. 2 is a functional block diagram illustrating a data processing environment ("environment"), generally designated 200, in accordance with an embodiment of the present invention. FIG. 2 provides only an illustration of one embodiment and does not imply any limitations with regard to the environments in which different embodiments may be implemented. Many modifications to the depicted environment may be made by those skilled in the art without departing from the scope of the invention, as recited by the claims. In this exemplary embodiment, environment 200 includes smart contact lens 120, remote device 130, server 140, all interconnected over network 150. Remote device 130, and server 140 may include internal and external hardware components, as depicted and described in further detail with respect to FIG. 4.

Network 150 may be a local area network ("LAN"), a wide area network ("WAN"), such as the Internet, the public switched telephone network ("PSTN"), a mobile data network (e.g., wireless Internet provided by a third or fourth generation of mobile phone mobile communication), a private branch exchange ("PBX"), any combination thereof, or any combination of connections and protocols that will support communications between smart contact lens 120, remote device 130, and server 140.

Network 150 architecture may include one or more information distribution network(s) of any type(s), such as, cable, fiber, satellite, telephone, cellular, wireless, etc., and as such, may be configured to have one or more communication channels. In another embodiment, network 150 may represent a "cloud" of computers interconnected by one or more networks, where network 150 is a computing system utilizing clustered computers and components to act as a single pool of seamless resources when accessed.

The various aspects of network 150 are not limited to radio frequency wireless communications; rather, communication may be accomplished via any known mediums in the art, including but not limited to, acoustic mediums, and optical mediums, such as, visible or infrared light. For example, data exchanged between devices, may be transmitted via infrared data links using well known technologies, such as infrared transceivers included in some mobile device models.

Network 150 may include two or more distinct networks. In an embodiment, smart contact lens 120 may be in communication with remote device 130 through, for example, a wireless personal area network ("WPAN"), a private network carried over wireless network technologies such as Bluetooth® or peer-to-peer communications over a wireless LAN (Note: the term "Bluetooth" is a registered trademark of Bluetooth SIG, Inc. and may be subject to trademark rights in various jurisdictions throughout the world and are used here only in reference to the products or services properly denominated by the marks to the extent that such trademark rights may exist). Networks with a small geographic scope may range from Near Field Communication (NFC) to Local Area Networks (LANs). A computer network with a small geographic scope typically does not have a connection to the Internet or other remote networks. Secondly, remote device 130 may be in communication with server 140 through, for example, a wide area network ("WAN"), such as the Internet. Additionally, in an embodiment, smart contact lens 120 may be in direct communication with server 140, and may not be in direct communication with remote device 130. For instance, smart contact lens 120 may only have tangential communication with remote device 130, as server 140 communicates directly with smart contact lens 120 and remote device 130.

Smart contact lens 120 is capable of capturing video and transmit the images to a repository (e.g., information repository 134 and/or information repository 144). Additionally, smart contact lens 120 may include internal and external hardware components, as depicted and described in further detail with respect to FIG. 4. Further, smart contact lens 120 may include a power source (not depicted in FIG. 2). In this embodiment, smart contact lens 120 can be powered by the kinetic energy generated by the blinking of a user wearing contact lens 120. Smart contact lens 120 includes sensor 122, and instrument 124. In another embodiment, smart contact lens may include dynamic recording program 142 and/or information repository 144.

For illustrative purposes, FIG. 2 depicts only a single sensor 122 and a single instrument 124, however, it should be understood that a smart contact lens 120 may include two or more sensors and two or more instruments.

In an embodiment, sensor 122 may measure the size of the pupil. In another embodiment, sensor 122 may track changes to the size of the pupil. For example, a person's pupil may change size for numerous reasons, one of which is excitement and/or interest in the subject matter the user is looking at. In an embodiment of the present invention, sensor 122 may detect changes in and measure the size of pupil 114, in determining when to, and when not to record (see instrument 124, for further details). Therefore, based on a level of interest, and on a set of detected patterns, behavioral deviations, biometric data, rules, and learned rules, dynamic recording program 142 may record what user is looking at.

In an embodiment sensor 122 may measure ambient light. Dynamic recording program may correlate a sudden change in ambient light with a change in pupil dilation to determine recordation is not required as the eye is reacting to the user going into a dark or brightly lit area. Additionally, based on the amount of ambient light the recording device, of instrument 124 (see, instrument 124 description below), is expose the image correctly and able to thereby capture a crisp video of the subject, the user is looking at.

In an embodiment, sensor 122 can measure a one or more biological and/or physiological activities of the user. For example, sensor 122 may measure the user's (i) heart rate; (ii) blood pressure; (iii) salinity of the eye; (iv) hormones; (v) temperature; (vi) rate of blinking the eye lid; and (vii) electrical nerve synapsis.

In an embodiment, sensor 122 may measure distance between the user and the object the user is looking at. Based on the distance, the lens on the recording device (see, instrument 124 description below), is able to focus on, and thereby able to thereby capture a video of the subject, the user is looking at.

In an embodiment, sensor 122 may detect the directional movement of the eye. For example, sensor 122 can detect movement of eye as well as other biometric data. As discussed in greater detail below, dynamic recording program 142 may utilize the biometric and movement data of the eye to infer excitement and subsequent commence recording.

In an embodiment, sensor 122 may detect movement of the eye lid (i.e., the eye lid covering and uncovering the eye, blinking).

In an embodiment, sensor 122 may possess global positioning data thereby providing dynamic recording program 142 to geo-stamp the location of each recorded video.

Instrument 124 may represent any number of instruments used to capture image (e.g., camera). In an embodiment, instrument 124 may contain a plurality of features allowing it to be embedded in smart contact lens 120. For example, instrument 124 may represent one or more video capturing device which can wireless stream the images to an information repository (e.g., information repository 134 and/or information repository 144). A video capturing device capable of recording video may include a camera, an optical image capturing device, an infrared capturing device, a spectral or multi-spectral device, a sonic device, or any other image capturing and/or producing device. In an embodiment, a camera may be capable of taking: (i) moving video images; (ii) still pictures; and (iii) continuous video images. In an embodiment, instrument 124 may be a camera with a wide angle lens capable of viewing more than a typical human eye can preserve. In an alternative embodiment, instrument 124 may be a camera with a tele-photo lens capable of viewing large distances typical human eye can preserve. In an embodiment the orientation of instrument 124 may be fixed to a position on smart contact lens 120.

Instrument 124 may represent a wireless transmitter which is capable of communicating through a channel information received from sensor 122 and/or images received from a video recorder through wireless transmitter of instrument 124.

Environment 200, depicts only a single remote device 130, however, it should be understood that environment 200 may include two or more remote devices may be utilized. For example, remote device 130 may be two separate devices e.g., a smart phone, and a smart watch. Remote device 130 may include a wearable device, and/or a non-wearable device. Wearable device may include, for example, headphones, a smart watch, a smart ring, or any other device that can be worn. Remote device 130 may include internal and external hardware components, as depicted and described in further detail with respect to FIG. 4. As depicted, environment 100 contains remote device 130 includes, sensor 132 and information repository 134.

In an embodiment, remote device 130 may be a mobile device such as a personal digital assistant (PDA), a smart phone, a personal laptop computer, a tablet computer, a netbook computer, a personal computer (PC), a desktop computer, or any programmable electronic device capable of communicating with smart contact lens 120, and server 140 via network 150. Remote device 130 may have a graphical user interface (GUI) allowing user to manually enable and disable video capture through smart contact lens 120. The GUI may also allow user to select preferences and provide configuration and preferences as to when dynamic recording program 142 should engage and/or disengage image capturing instrument of instrument 124.

In an embodiment, remote device 130 may, through sensor 132 detect and track its geographical location. In an embodiment remote device 130 may through sensor 132 may detect and measure the heart rate of user.

Regardless of the type of remote device(s) 130 utilized in environment 200, information repository 134 stores information received from sensor 132. In other embodiments, information repository 144 may store information from sensor 122 and sensor 132. In this embodiment, information repository 134 may include any suitable volatile or non-volatile computer readable storage media, and may include random access memory (RAM) and cache memory (not depicted in FIG. 2). Alternatively, or in addition to a magnetic hard disk drive, the persistent storage component can include a solid state hard drive, a semiconductor storage device, read-only memory (ROM), erasable programmable read-only memory (EPROM), flash memory, or any other computer readable storage media that is capable of storing program instructions or digital information. While information repository 134 is depicted on remote device 130, it is noted that information repository 134 directly stream received information to information repository 144 on server 140 via network 150. Information repository 134 may be implemented using any architecture known in the art such as, for example, a relational database, an object-oriented database, and/or one or more tables. Information repository 134 may store actual data gathered by sensor 122 and/or sensor 132. Information stored in information repository 144 may include: various geographical locations, biometric data, captured video and pictures from smart contact lens 120, and the like.

Further, in an embodiment information repository 134 may store captured images received from smart contact lens 120. Similarly, information repository 134 may track if and when user deletes the captured images. In this scenario, based on one or more learned situations, dynamic recording program 142, may learn when not to record video based on repeated deletions of captured video by user.

In the exemplary embodiment, server 140 is a server computer. In other embodiments, server 140 may be a management server, a web server or any other electronic device capable of receiving and sending data. Server 140 may be desktop computers, laptop computers, specialized computer servers, or any other computer system known in the art. Server 140 represents computer systems utilizing clustered computers and components to act as a single pool of seamless resources when accessed through network 150. For example, such embodiments may be used in data center, cloud computing, storage area network (SAN), and network attached storage (NAS) applications. In certain embodiments, server 140 represents virtual machines. In other embodiments, server 140 may be a management server, a web server or any other electronic device capable of receiving and sending data. In another embodiment, server 140 may represent a server computing system utilizing multiple computers as a server system, such as in a cloud computing environment. In general, server 140 is representative of any electronic devices, or combination of electronic devices, capable of executing machine-readable program instructions, as described in greater detail with regard to FIG. 4. Server 140 contains dynamic recording program 142 and information repository 144.

In this embodiment, dynamic recording program 142 determines whether to capture video based, at least in part, on biometric data, geographical locations, contextual meanings of subject matter being observed, and learned behavior of a user wearing smart contact lens 120. Dynamic recording program 142 can then transmit instructions to instrument 124 to automatically commence recording of a subject matter and/or event. Dynamic recording program 142 can further identify contextual information of the recorded subject matter, and save the recorded subject matter based on the identified contextual information. Dynamic recording program 142 may be located as depicted in server 140; however in alternative embodiments (not shown) dynamic recording program 142 may be located on a remote cloud. Dynamic recording program 142 may be embedded and located within smart contact lens 120. Dynamic recording program 142 may be stored on remote device 130, within information repository 134. Dynamic recording program 142 may be stored in a persistent storage component (not depicted) for execution and/or access by one or more processor(s) via one or more memories (for more detail refer to FIG. 4). While depicted on server 140, in the exemplary embodiment, dynamic recording program 142 may be on a remote server or a "cloud" of computers interconnected by one or more networks utilizing clustered computers and components to act as a single pool of seamless resources, accessible to dynamic cleaning program via network 150.

Regardless of where dynamic recording program 142 is located, dynamic recording program 142 may have access to one or more different features which analyze and categorize captured video as well as determining when to and when not to record.

In an embodiment of the present invention dynamic recording program 142 provides a layer of control regarding when smart contact lens 120 should record a specific activity, as well as where to save the captured image(s).

In an embodiment, dynamic recording program 142 may classify content of a recording based on cognitive contextual analysis of one or more learned or defined subjects including but not limited to: (i) persons; (ii) objects; (iii) places; and (iv) activities of the user. In this scenario, dynamic recording program 142 may determine whether to enable smart contact lens 120 to record and capture the current context. For example, dynamic recording program 142 may continually analyze a stream of images received from smart contact lens and upon a specific occurrence, enable video capture. In another example, dynamic recording program 142 may continually analyze a stream of images received and recorded from smart contact lens and upon a specific occurrence, disable video capture.

In an embodiment, dynamic recording program 142 based on a classification content of the recorded content (per a cognitive contextual analysis) may determine whether the recorded subject is to be private publicly accessible. For example, dynamic recording program 142 may determine whether the stream the recording from smart contact lens 120 to an intermediary device (e.g., remote device 130) or directly to a remotely located information repository (e.g., a cloud based repository).

Similarly, in another embodiment, dynamic recording program 142 may define persons, objects, places, activities, and the like based on a classification content of the recorded content (per a cognitive contextual analysis). For example, specific persons, places, objects, and activities may be given specific categories such as (i) restricted; (ii) public; (iii) private. Thus, based on a specific category a specific persons, places, objects, and activities falls into, dynamic recording program 142 determine (i) whether to record and capture the activity; and, (ii), how and where the captured video should be saved in response to recording and capturing the activity. For example, if the video capture falls under restricted category, it could be limited viewing just for the user of smart contact lens 120. If the video captured falls under a private category, the video may be viewed by a set of predefined and/or learned persons. Similarly, if the video captured falls under a public category, the video may be uploaded to, for instance, social media platform for anyone to view.

For example, an embodiment may classify the content of the captured subject based on cognitive system contextual analysis based on learned and/or pre-defined persons, objects, places, and/or activities of the user. In this embodiment of the present invention, dynamic recording program 142 may be contextually aware based on learned actions and pre-defined rules from previous capture of images/video responsive to how the user interacted and/or removed the capture video from information repository 134 and/or information repository 144.

Furthermore, dynamic recording program 142 may learn what contextual situations a user manually disables and enables video capture. For instance, if user enables and/or disables video capture within a predefined time period of video capture (before and/or after) dynamic recording program 142 may learn based on one or more contextual situations, whether to enable or disable video capture in the future. In another embodiment, dynamic recording program 142 may learn one or more situations (e.g., persons places, objects, and activities) that should be give a specific privilege category such as, restricted, public, and private. For instance, when dynamic recording program 142 recognizes the captured video should be public, dynamic recoding program 142 may upload and stream the captured video from smart contact lens 120 to an intermediary device (i.e., remote device 130) or directly to a cloud based repository (i.e., information repository 144). If, for instance, dynamic recording program 142 recognizes the captured video should be restricted, dynamic recoding program 142 may stop recording and/or upload the captured video from smart contact lens 120 directly to user's private information repository.

In another embodiment, dynamic recording program 142 may detect when a user deletes captured recordings, and learn based on those situations and scenarios when not to record. For example, if the subject matter contains specific person or activity, dynamic recording program 142 may learn not to record when user regularly deletes said recording within a determined time period after video capture.

In another embodiment, dynamic recording program 142 may measure one or more biometric statistics of user of smart contact lens 120 to gauge and determine interest of user in the subject matter. For instance, a user's interest is related to a user's attentiveness and/or importance the user paces on the object. Therefore, based on the user's interest, dynamic recording program 142 may determine whether the capture and record the events taking place. For example, dynamic recording program 142 may, based on sensor 122 readings of smart contact lens 120, correlate pupil dilation to determine interest. For instance, dynamic recording program 142 identifies a user's interest in an object when the user's pupils dilate, based on received information from sensor 122. In another example, dynamic recording program 142 may, based on sensor 132 of remote device 130, correlate heart rate to determine interest. For instance, dynamic recording program 142 identifies a user's interest in an object when the user's heart rate increases.

In both aforementioned instances (measuring pupil diameter size and heart rate) dynamic recording program 142 may have one or more systems in place to identify if the user is interested in the object. For example, a typical persons pupils will dilate when user leaves a dark area and enters a location full of light. Therefore, an embodiment of the present invention, sensor 122 be a light detection sensor which detects sudden changes in ambient light. Thus, when the user leaves a dark area, and enters an area full of bright light, light detecting sensor (part of sensor 122), may recognize the change in ambient light and dynamic recording program 142 may determine not to capture video regardless of pupil dilation.

In another example, a typical person's heart rate will increase during strenuous activity, e.g. working out. Therefore, an embodiment of the present invention, sensor 122 may be a pedometer which detects when the user is running based on the users pace. Thus when a user starts on a jog, pedometer (part of sensor 122), may recognize the change in the users pace and then dynamic recording program 142 may determine not to capture video regardless of the user's increased heart rate.

In addition to learning when to commence and end recording, an embodiment of the present invention may learn when certain objects, situations are not to be captured. In this scenario, such objects and or stations may be pre-defined, and learned.

In addition to learning when to and when not to record, an embodiment of the present invention may learn to classify certain captured and recorded video. Therefore, based on the classification, dynamic recording program 142 may categorize captured video/images as in a plurality of different predefined categories, for example, (i) restricted, (ii) public and (iii) private. Thus, once the captured video is classified into a category, depending on the category, the captured video may be stored and subsequently shared on different platforms (e.g., social media, public cloud, private network, etc.). Specifically, embodiments of the present invention are contextually aware of specific persons, places and user activity through facial recognition, object recognition, location recognition global positioning systems, biometric sensors, and audio data. Based on the received and derived data, dynamic recording program 142 identifies specific people, objects, activities, and topics (both oral and written) which are deemed restricted. Conversely, based on the received and derived data, dynamic recording program 142, identifies when to capture specific people, objects activities and topics (both oral and written). Specifically, an embodiment of the present invention is contextually aware based on learned actions and pre-defined rules from previous capture of images/video responsive to how the user interacted and/or removed the capture video from information repository 134 and/or information repository 144.

Information repository 144 stores information received from sensor 122 and sensor 132. In other embodiments, information repository 144 may store information from one or more other components of environment 200. In this embodiment, information repository 144 may include any suitable volatile or non-volatile computer readable storage media, and may include random access memory (RAM) and cache memory (not depicted in FIG. 2). Alternatively, or in addition to a magnetic hard disk drive, the persistent storage component can include a solid state hard drive, a semiconductor storage device, read-only memory (ROM), erasable programmable read-only memory (EPROM), flash memory, or any other computer readable storage media that is capable of storing program instructions or digital information. While information repository 144 is depicted on server 140 it is noted that information repository 144, may be on a remote server or a "cloud" of computers interconnected by one or more networks utilizing clustered computers and components to act as a single pool of seamless resources, accessible to dynamic recording program 142 via network 150. Information repository 144 may be implemented using any architecture known in the art such as, for example, a relational database, an object-oriented database, and/or one or more tables. Information repository 144 stores actual, modeled, predicted, or otherwise derived patterns of user's video recording habits as well as biological data based on received sensor data. For example, information repository 144 may store all information received from sensor 122 and/or sensor 132. Information repository 144 may contain lookup tables, databases, charts, graphs, functions, equations, and the like that dynamic recording program 142 may access to both maintain a specific parameter as well as manipulate various parameters. Information stored in information repository 144 may include: various geographical locations, specific actions linked to a various detected issue, a set of rules, learned patterns, biometric data, contextual data, historical data (e.g., if user deleted video after recording, and if user manually recorded video) and the like.

Information repository 144 may contain information which dynamic recording program 142 may leverage in determining specific actions to perform based on a variety of sensor 122 and sensor 132 readings. Similarly, information repository may contain various environmental factors which may be utilized by dynamic recording program 142 in determining one or more instances to record and the method of recordation saving. Information repository 144 may contain historic data from sensor readings and from previous determinations thereby providing dynamic recording program 142 any requisite information to predict whether user requires recording.

In an embodiment, information repository 144 may contain sensor 122 and/or sensor 132 readings in order to forecast and predict whether to record. Dynamic recording program 142 may cross reference information contained in information repository 144 and information repository 134 to derive a cognitive pattern, thereby creating new rules and when to enable and disable recording from smart contact lens 120.

Reference is now made to FIG. 3. FIG. 3 is flow chart 300, illustrating operational steps for contextual video capture, in accordance with an embodiment of the present invention.

In step 310, dynamic recording program 142 receives identifying information. In an embodiment, identifying information may be biometric data of user. In another embodiment, identifying information may be based on detected contextual identifier. In another embodiment, identifying information may be both, biometric data and detected contextual identifier.

Dynamic recording program 142 may receive identifying information of one or more contextual identifiers. A contextual identifier is a person, place, object, and/or activity which dynamic recording program 142 can recognize through facial recognition, object recognition, audio detection, and location positioning services (e.g., G.P.S.). Contextual identifiers may be predefined or machined learned. Predefined contextual identifiers are predefined by the user and or a system administrator. Additionally, predefined contextual identifiers may outline specific categories to which dynamic recording program 142 is to classify each contextual identifier, for example whether the given category is public or private (see step 330). Machine learned contextual identifiers learn based on repeated stations whether the user either manually disables video capture, or deletes a previously captured video within a specific time period (e.g., immediately following capture, or shortly after user realizes video was captured.) Machine learned contextual identifiers learn may learn to enable/disable video recording based on through facial recognition, object recognition, audio detection, and location positioning services (e.g., G.P.S.). Further, in an embodiment, contextual identifiers may be received from sensor 122. In another embodiment, contextual identifiers may be received from any component of environment 200 (i.e., information repository 134, or information repository 144).

Dynamic recording program 142 may receive identifying biometric data of user. For example, dynamic recording program 142 may receive pupil size and/or detect sudden changes in pupil diameter. In this scenario, dynamic recording program 142 may also receive ambient light readings in addition to pupil size. In another example, dynamic recording program 142 may receive heart rate and/or heart rhythm of user. In this scenario, dynamic recording program 142 may also receive an indication of user's activity level such as accelerometers, pedometers, etc. In another example, dynamic recording program 142 may detect increase levels of hormones within user. In this scenario, dynamic recording program 142 may detect increases of adrenalin, oxytocin, etc.

In decision 320, dynamic recording program 142 determines whether to capture video. Based on biometric data, dynamic recording program 142 may determine to record video. In an embodiment, based on contextual identifiers, dynamic recording program 142 may determine to record image. Conversely, based on contextual identifiers, dynamic recording program 142 may determine not to capture image.

In an embodiment, dynamic recording program 142 may determine whether to capture video based solely on biometric data determine whether to enable video capture. In this embodiment, dynamic recording program 142 compares received on-demand biometric data to one or more baseline measurements in order to determine interest in the subject.

In instances where, dynamic recording program 142 fails to detect any biometric change and/or a contextual identifier, dynamic recording program 142 will continue to receive identifying information per step 310. In instances when identifying information (received in step 310) identify particular biometric data of user and/or specific detected contextual identifier, dynamic recording program 142 may determine it is not appropriate to record. The determination not to record may be based on a particular learned and/or predefined biometric data response, and/or contextual identifier. For example, through machine learning and/or predefined rules, dynamic recording program 142 may, not record based upon detection of a particular hormone via sensor 122, is identified. In another example, dynamic recording program 142 may not record if a light sensor (sensor 122) detects a sudden change in ambient even if sensor 122 detects a pupil dilation light. In another example, dynamic recording program 142 may not record if a particular person is identified through facial recognition. In another example, dynamic recording program 142 may not record if a user is in a particular location through, as identified by location determining services (e.g., GPS, IP address, etc.). In another example, dynamic recording program 142 may not record if a particular phrase is identified through audio recognition. In another example, dynamic recording program 142 may not record if a particular object is identified through object recognition. In another example, dynamic recording program 142 may not record if a particular written phrase is identified through object recognition (e.g., the phrase "confidential"). Therefore, upon determining not to record, dynamic recording program 142 continues to receive identifying information per step 310, until identifying information such as biometric data and/or a contextual identifier is detected.

In instances when identifying information (received in step 310) identify particular biometric data of user and/or specific detected contextual identifier, dynamic recording program 142 may determine it is appropriate to record. For example, pupil dilation may have a normal and an excited range. The more excited dynamic recording program 142 determines the user is, the more likely video capture will be enabled. For example, where biometric data indicates an elevated heart rate, dynamic recording program 142 determines to captures video. For another example, where biometric data indicates a change of pupil dilation (without a change in ambient light), dynamic recording program 142 determines to captures video. For another example, where biometric data indicates a change of pupil dilation (regardless of a change in ambient light), dynamic recording program 142 determines to captures video. For another example, upon detecting pupil dilation (due to decrease ambient light) and an increased heart rate at bed time (typically users heart rate decreases at bed time), dynamic recording program 142, may determine to record as the increased heart rate breaks from users normal routine. For another example, where biometric data indicates a combination of elevated heart rate and large pupil dilation, dynamic recording program 142 determines to captures video. For another example, where contextual identifiers such as a location (e.g., conference room) indicate that it is appropriate to record, dynamic recording program 142 determines to captures video. In another example, dynamic recording program 142 may determine to record if a user is in a particular location through, as identified by location determining services (e.g., GPS, IP address, etc.). In another example, dynamic recording program 142 may record if a particular phrase is identified through audio recognition. In another example, dynamic recording program 142 may record if a particular object is identified through object recognition. In another example, dynamic recording program 142 may record if a particular written phrase is identified through object recognition (e.g., the phrase "non-confidential").

Further, heart rate measurements may be normalized based on changes in user's level of activity. Therefore, if dynamic recording program 142 determines that user's increased heart rate is due to user being currently active, then it is less likely video capture will be enabled. Conversely, if dynamic recording program 142 determines that user's increased heart rate is due to user being excited about the subject, then video capture will be enabled.

For another example, specific facial expressions trigger and/or prohibit video capture. For example, sensor 122 of smart contact lens 120 may detect facial movements of user. Dynamic recording program 142, may analyze the detected facial movements of user to derive interest in the subject. Therefore, as the detected facial expresses portray more excitement, dynamic recording program 142 will be enabled video capture. Conversely, the less excited the user is about a subject, dynamic recording program 142 will disable video capture.

Dynamic recording program 142 may receive additional types biometric data, known in the art and interpret user's excitement and/or interest in the subject.

In an embodiment, dynamic recording program 142 determines to capture video by correlating two or more received biometric information to analyze user's stimulation and interest in the subject. For example, if pupil dilation depicts an average interest and heart rate portrays a low interest, then dynamic recording program 142 may determine not to record. However, if both heart rate and pupil dilation depict an average interest, then dynamic recording program 142 may determine to capture video.

Therefore, in decision 320, dynamic recording program 142 determines to capture video by mapping or correlating interest level and comparing the mapped/correlated interest level to a predefined threshold. Therefore, if user's interest is below the threshold, then dynamic recording program 142 may determine not to capture video. If user's interest is above the threshold, then video capture is enabled.

Further, in decision 320, in an embodiment, dynamic recording program 142 may, based solely on contextual identifying data, determine whether to enable video capture. In this embodiment, dynamic recording program 142 identifies the presence of one or more specific identifiers. Specific identifiers may include a specific person, a specific object, user's location, and user's current activity. Once a specific identifier is detected, dynamic recording program 142 may determine whether to capture video or prohibit video capture.

Received identifying information may be gathered from, audio sources, facial recognition, voice analysis, ocular movements, changes in biometrics (i.e., pupil size, heart rate, hormone changes, temperature changes, etc.), and/or any other analytics for analyzing video/audio data received from one or more sources, by dynamic recording program 142.

In an embodiment, dynamic recording program 142 continually parses images received from smart contact lens 120 in order to detect one or more contextual identifiers. Dynamic recording program 142 can then utilized the detected contextual identifiers to determine to capture video. In an embodiment, dynamic recording program 142 may also continually parses received audio from remote device 130 in order to detect one or more contextual identifiers. Contextual identifiers may be predefined and/or learned. Predefined contextual identifiers may be based on facial recognition, object recognition, audio detection recognition, and location positioning services (e.g., G.P.S.). Additionally, contextual identifiers may continually change as dynamic recording program 142 is continually learning. For example, dynamic recording program 142 may through machine learned contextual identifiers discover based on repeated stations whether the user either manually disables video capture, or deletes a previously captured video within a specific time period (e.g., immediately following capture, or shortly after user realizes video was captured.) Machine learned contextual identifiers may learn to enable/disable video recording based on through facial recognition, object recognition, audio detection recognition, and location positioning services (e.g., G.P.S.).

For example, based on learned contextual identifiers, dynamic recording program 142 may learn to enable/disable video capture based on the presence of a specific person to be captured based on facial recognition. For instance, user may delete captured video of a specific person (e.g., users child), and therefore dynamic recording program 142 learns not to capture video of the specific person. Conversely, if user rarely deletes images of a specific person, dynamic recording program 142 may determine to always capture video of said person.

For another example, based on learned contextual identifiers, dynamic recording program 142 may learn to enable/ disable video capture based on the presence of a specific object to be captured based on object recognition. For instance, user may delete captured video of food, and therefore dynamic recording program 142 learns not to capture video food when the user is eating. Conversely, if user rarely deletes images of a food on a plate when eating, dynamic recording program 142 may determine to always capture video of said action. For another example, dynamic recording program 142 may learn to disable video capture based on the presence of specific written words. For instance, if user reviews a document which states the word "confidential" (or the like), dynamic recording program 142 may disable and delete the captured video.

For another example, based on learned contextual identifiers, dynamic recording program 142 may learn to enable/disable video capture based on user located within a specific geographical position based on GPS location. For instance, a user may delete captured video of the user's office location, and therefore dynamic recording program 142 learns not to capture video food when the user is at work. Conversely, if user rarely deletes images while at work, dynamic recording program 142 may determine to always capture video of said action. Additionally, contextual identifiers may be predefined based on the user's location. For instance, when user is at work, (as determined by e.g., GPS location services, IP address of remote device, etc.) a user may predefine the location to be restricted and prohibit any video capture. Similarly a restricted category may be established when dynamic recording program 142, through object recognition, detects a confidentiality identification on a document.

For another example, based on learned contextual identifiers, dynamic recording program 142 may learn to enable/disable video capture based on user current activity as detected based on one or more biometric sensors and location determining sensors (e.g., GPS). For instance, user may delete captured video of working out, and therefore dynamic recording program 142 learns not to capture video when user is working out. Conversely, if user rarely deletes images while working out, dynamic recording program 142 may determine to always capture video when user works out.

Therefore, in decision 320, dynamic recording program 142 may determine whether to enable video capture based detecting one or more contextual identifiers. Therefore, upon detecting a predefined and/or learned contextual identifier, dynamic recording program 142 may determine whether to enable video capture or disable video capture.

Dynamic recording program 142 may analyze both contextual identifiers and biometric data simultaneously to determine whether to capture video in decision 320. For example, certain contextual identifiers may indicate the subject to be videotaped is restricted and prevent video capture, regardless of user's interest level (as derived from received biometric data). In another example, certain contextual identifiers may indicate the subject to be videotaped is always to be recorded and to enable video capture, regardless of user's interest level (as derived from received biometric data).

Therefore, in decision 320, dynamic recording program 142 may determine whether to enable video capture based detecting one or more contextual identifiers regardless of biometric data (even when biometric data indicates no level of interest). Similarly, dynamic recording program 142 may determine to restrict and prohibit video capture based on one or more contextual identifiers regardless of biometric data (even when biometric data indicates a level of interest). Further, dynamic recording program 142 may determine whether to enable video capture based determined interest, through biometric data, regardless of detecting one or more contextual identifiers. Therefore, dynamic recording program 142 may determine whether to enable video capture or disable video capture, based upon detecting a predefined and/or learned contextual identifier coupled with an indication of interest based on received biometric data.

If in decision 320, dynamic recording program 142 determines to capture video then in step 330, dynamic recording program 142 identifies the video capture category. In an embodiment, video capture category may be public or private. A public category is a category which may be social media and/or other medium which is accessible to the public. A private category limits access to the captured images only to the user. Additional categories may be present in other embodiments. For example, an additional categories may be limited to one or more social group. For instance, if a specific person is detected in the image, then the category may be semi private, allowing access to a predefined set of persons.

In an embodiment, after determining to capture video (see decision 320), dynamic recording program 142 determines where the captured video should be streamed and/or saved based on identifying the video capture category (step 330). For example, dynamic recording program 142 may continually analyze images from smart contact lens 120, in order to detect any contextual identifiers, in order to place the captured image into a specific category. In another example, dynamic recording program 142 may at predetermined time intervals analyze images from smart contact lens 120, in order to detect any contextual identifiers, in order to place the captured image into a specific category. In another example, dynamic recording program 142 may on demand analyze images from smart contact lens 120, in order to: (i) detect any contextual identifiers; and (ii) place the captured image into a specific category.

Dynamic recording program 142 may have predefined and/or learned contextual situations which indicate which category the captured video should be classified. In an embodiment, based on the identified contextual situation, the captured video may be classified as public, private, etc. For example, users may predefine any captured video to be private upon identifying a specific person (i.e., user's child) through facial recognition, in the captured video. For another example, user may predefine any captured video to be public upon identifying a specific object (i.e., user's vehicle) through object recognition, in the captured video. For another example, user may predefine any captured video to be private upon identifying user is in a specific location (i.e., user's bedroom) through object location based services. For another example, users may predefine any captured video to be public upon identifying user is on vacation touring a known landmark (i.e., user's bedroom) through object location based services. For another example, users may predefine any captured video to be public upon identifying a predefined string of spoken words (i.e., a specific phrase) through audio recognition, associated with the captured video.

In step 340 dynamic recording program 142 records and saves the video, based on the identified category (see step 330). In this embodiment, in instances where dynamic recording program 142 identifies the event as private, dynamic recording program 142 records and saves the video by transmitting a set of instructions to instrument 124 of smart contact lens 120 to record and save the video to information repository 144. In instances where dynamic recording program 142 identifies the event as public, dynamic recording program 142 can transmit a set of instructions to instrument 124 to stream to information repository 134. In an embodiment, the captured video may be streamed to information repository 134 on remote device 130. In another embodiment, the captured video may be streamed to information repository 134 on server 140. In another embodiment, the captured video may be streamed directly to social media. In another embodiment, the captured video may be streamed to user's private information repository. In another embodiment, the captured video may be streamed to a shared repository.

Figure 4:
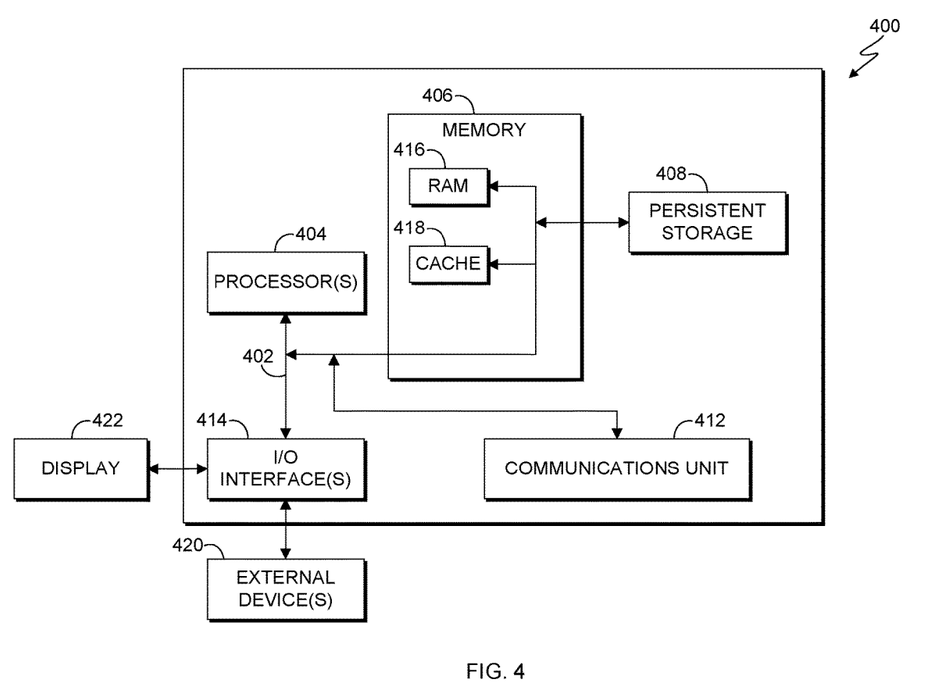
FIG. 4 is a block diagram of the internal and external components of a computer system, in accordance with an embodiment of the present invention.

FIG. 4 is a block diagram of internal and external components of a computer system 400, which is representative of the computer systems of FIG. 1, in accordance with an embodiment of the present invention. It should be appreciated that FIG. 4 provides only an illustration of one implementation, and does not imply any limitations with regard to the environments in which different embodiments may be implemented. Many modifications to the depicted environment may be made.

Computer system 400 includes communications fabric 402, which provides communications between computer processor(s) 404, memory 406, persistent storage 408, communications unit 412, and input/output (I/O) interface(s) 414. Communications fabric 402 can be implemented with any architecture designed for passing data and/or control information between processors (such as microprocessors, communications and network processors, etc.), system memory, peripheral devices, and any other hardware components within a system. For example, communications fabric 402 can be implemented with one or more buses.

Memory 406 and persistent storage 408 are computer readable storage media. In this embodiment, memory 406 includes random access memory (RAM) 416 and cache memory 418. In general, memory 406 can include any suitable volatile or non-volatile computer readable storage media.

Persistent storage 408 may include, for example, a plurality of magnetic hard disk drives. Programs are stored in persistent storage 408 for execution and/or access by one or more of the respective computer processors 404 via one or more memories of memory 406. In this embodiment, persistent storage 408 includes a magnetic hard disk drive. Alternatively, or in addition to a magnetic hard disk drive, persistent storage 408 can include a solid state hard drive, a semiconductor storage device, read-only memory (ROM), erasable programmable read-only memory (EPROM), flash memory, or any other computer readable storage media that is capable of storing program instructions or digital information.

The media used by persistent storage 408 may also be removable. For example, a removable hard drive may be used for persistent storage 408. Other examples include optical and magnetic disks, thumb drives, and smart cards that are inserted into a drive for transfer onto another computer readable storage medium that is also part of persistent storage 408.

Communications unit 412, in these examples, provides for communications with other data processing systems or devices. In these examples, communications unit 412 includes one or more network interface cards. Communications unit 412 may provide communications through the use of either or both physical and wireless communications links. Software and data used to practice embodiments of the present invention can be downloaded to computer system 400 through communications unit 412 (i.e., via the Internet, a local area network, or other wide area network). From communications unit 412, the software and data may be loaded to persistent storage 408.

I/O interface(s) 414 allows for input and output of data with other devices that may be connected to computer system 400. For example, I/O interface 414 may provide a connection to external devices 420, such as a keyboard, keypad, a touch screen, and/or some other suitable input device. External devices 420 can also include portable computer readable storage media such as, for example, thumb drives, portable optical or magnetic disks, and memory cards. Software and data used to practice embodiments of the present invention, can be stored on such portable computer readable storage media and can be loaded onto persistent storage 408 via I/O interface(s) 414. I/O interface(s) 414 also connect to a display 422.

Display 422 provides a mechanism to display data to a user and may be, for example, a computer monitor. Display 422 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
    receiving, by one or more processors, a set of identifying information and a video stream from a contact lens;
    determining, by one or more processors, whether to capture the video stream, wherein determining whether to capture the video stream is based on, at least one of, the user interest level exceeding a threshold and detection of a contextual identifier within the received video stream from the contact lens;
    classifying, by one or more processors, the video stream into a category;
    responsive to determining to capture the video stream, saving, by one or more processors, the video stream based on the classification category of the video stream; and
    creating, by one or more processors, a new contextual identifier, wherein creating a new contextual identifier comprises:
        identifying, by one or more processors, at least two incidences of the user deleting the saved video stream, subsequent to the saving the video stream, within a predetermined time,
        deriving, by one or more processors, at least one common person, object, place and activity within each of the identified incidences, and
        responsive to deriving at least one common person, object, place and activity within each of the identified incidences, determining, by one or more processors, a habitual pattern of the user deleting the saved video stream, subsequent to the saving of the video stream.

2. The method of claim 1, wherein the contextual identifier is one or more predefined person, object, place and activity.

3. The method of claim 1, further comprises:
    determining, by one or more processors, the user interest level, based on biometric data of the user, wherein:
        the biometric data of the user is received from the set of identifying information, and
        determining the user interest level comprises detecting, by one or more processors, at least one of:

a change in the user's pupil dilation;
a change in the user's heart rate; and
a change in the user's facial expression.

4. The method of claim 1, wherein detecting the contextual identifier comprises:
analyzing, by one or more processors, the received video stream from the contact lens; and
applying, by one or more processors, at least one audio/video recognition system, wherein the at least one audio/video recognition system searches the received video stream for a predefined person, a predefined object, a predefined place, a predefined activity, and a predefined audible clip.

5. The method of claim 1, wherein classifying the video stream into a category, further comprises:
establishing, by one or more processors, at least two categories, wherein a first category is public and the second category is private; and
determining, by one or more processors, a pattern wherein the pattern is:
of the user placing the video stream into one of the at least two categories, and
based on deriving, by one or more processors, at least one common person, object, place and activity within each category.

6. The method of claim 1, further comprising:
determining, by one or more processors, not to capture the video stream, wherein determining not to capture the video stream is based on, at least one of, the user interest level below a threshold and detecting a second contextual identifier within the received the video stream from a contact lens, wherein the second contextual identifier is classified as restricted.

7. A computer program product comprising:
a computer readable storage medium and program instructions stored on the computer readable storage medium, the program instructions comprising:
program instructions to receive a set of identifying information and a video stream from a contact lens;
program instructions to determine whether to capture the video stream, wherein the program instructions to determine whether to capture the video stream is based on, at least one of, the user interest level exceeding a threshold and detection of a contextual identifier within the received video stream from the contact lens;
program instructions to classify the video stream into a category;
responsive to determining to capture the video stream, program instructions to save the video stream based on the classification category of the video stream; and
program instructions to create a new contextual identifier, where the program instructions to create a new contextual identifier comprise:
program instructions to identify at least two incidences of the user deleting the saved video stream, subsequent to the saving the video stream, within a predetermined time,
program instructions to derive at least one common person, object, place and activity within each of the identified incidences, and
responsive to deriving at least one common person, object, place and activity within each of the identified incidences, program instructions to determine a habitual pattern of the user deleting the saved video stream, subsequent to the saving of the video stream.

8. The computer program product of claim 7, wherein the contextual identifier is one or more predefined person, object, place and activity.

9. The computer program product of claim 7, further comprising:
program instructions to determine the user interest level, based on biometric data of the user, wherein:
the biometric data of the user is received from the set of identifying information, and
the program instructions to determining the user interest level comprise:
program instructions to detect at least one of:
a change in the user's pupil dilation;
a change in the user's heart rate; and
a change in the user's facial expression.

10. The computer program product of claim 7, wherein the program instructions to detect the contextual identifier comprise:
program instructions to analyze the received video stream from the contact lens; and
program instructions to apply at least one audio/video recognition system, wherein the at least one audio/video recognition system searches the received video stream for a predefined person, a predefined object, a predefined place, a predefined activity, and a predefined audible clip.

11. The computer program product of claim 7, wherein the program instructions to classify the video stream into a category, further comprise:
program instructions to establish at least two categories, wherein a first category is public and the second category is private; and
program instructions to determine a pattern wherein the pattern is:
of the user placing the video stream into one of the at least two categories, and
based on program instructions to derive at least one common person, object, place and activity within each category.

12. The computer program product of claim 7, further comprising:
program instructions to determine not to capture the video stream, wherein determining not to capture the video stream is based on, at least one of, the user interest level below a threshold and detecting a second contextual identifier within the received the video stream from a contact lens, wherein the second contextual identifier is classified as restricted.

13. A computer system comprising:
one or more computer processors;
one or more computer readable storage media;
program instructions stored on the one or more computer readable storage media for execution by at least one of the one or more processors, the program instructions comprising:
program instructions to receive a set of identifying information and a video stream from a contact lens;
program instructions to determine whether to capture the video stream, wherein the program instructions to determine to capture the video stream is based on, at least one of, the user interest level exceeding a threshold and detection of a contextual identifier within the received video stream from the contact lens;
program instructions to classify the video stream into a category;

responsive to determining to capture the video stream, program instructions to save the video stream based on the classification category of the video stream; and program instructions to create a new contextual identifier, where the program instructions to create a new contextual identifier comprise:
- program instructions to identify at least two incidences of the user deleting the saved video stream, subsequent to the saving the video stream, within a predetermined time,
- program instructions to derive at least one common person, object, place and activity within each of the identified incidences, and
- responsive to deriving at least one common person, object, place and activity within each of the identified incidences, program instructions to determine a habitual pattern of the user deleting the saved video stream, subsequent to the saving of the video stream.

14. The computer system of claim 13, wherein the contextual identifier is one or more predefined person, object, place and activity.

15. The computer system of claim 13, further comprising:
program instructions to determine the user interest level, based on biometric data of the user, wherein:
the biometric data of the user is received from the set of identifying information, and
wherein the program instructions to determine the user interest level comprise:
program instructions to detect at least one of:
- a change in the user's pupil dilation;
- a change in the user's heart rate; and
- a change in the user's facial expression.

16. The computer system of claim 13, wherein the program instructions to detect the contextual identifier comprise:
program instructions to analyze the received video stream from the contact lens;
program instructions to apply at least one audio/video recognition system, wherein the at least one audio/video recognition system searches the received video stream for a predefined person, a predefined object, a predefined place, a predefined activity, and a predefined audible clip.

17. The computer system of claim 13, wherein the program instructions to classify the video stream into a category, further comprise:
program instructions to establish at least two categories, wherein a first category is public and the second category is private; and
program instructions to determine a pattern wherein the pattern is:
of the user placing the video stream into one of the at least two categories, and
based on program instructions to derive at least one common person, object, place and activity within each category.

* * * * *